(12) United States Patent
Ojima et al.

(10) Patent No.: US 9,291,155 B2
(45) Date of Patent: Mar. 22, 2016

(54) VACUUM PUMP MOTOR AND VACUUM PUMP HAVING BALANCE RINGS

(71) Applicant: EBARA CORPORATION, Tokyo (JP)

(72) Inventors: Yoshinori Ojima, Tokyo (JP); Takashi Hozumi, Tokyo (JP); Naoya Yoshida, Tokyo (JP); Takanori Inada, Tokyo (JP); Toshiharu Nakazawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 290 days.

(21) Appl. No.: 13/926,053

(22) Filed: Jun. 25, 2013

(65) Prior Publication Data

US 2014/0056733 A1 Feb. 27, 2014

(30) Foreign Application Priority Data

Aug. 21, 2012 (JP) .................................. 2012-182203

(51) Int. Cl.
| | |
|---|---|
| *H02K 7/04* | (2006.01) |
| *F04B 17/00* | (2006.01) |
| *F04C 29/00* | (2006.01) |
| *H02K 15/16* | (2006.01) |
| *F04B 17/03* | (2006.01) |
| *H02K 7/14* | (2006.01) |

(52) U.S. Cl.
CPC ............. *F04B 17/00* (2013.01); *F04C 29/0085* (2013.01); *H02K 7/04* (2013.01); *F04C 2220/10* (2013.01); *F04C 2230/605* (2013.01); *F04C 2240/40* (2013.01); *F04C 2270/12* (2013.01); *F04C 2280/04* (2013.01); *H02K 7/14* (2013.01)

(58) Field of Classification Search
CPC ....... H02K 7/04; H02K 15/16; H02K 15/165; F04B 17/03
USPC ............................................ 310/45, 400–417
See application file for complete search history.

(56) References Cited

U.S. PATENT DOCUMENTS

| | | | |
|---|---|---|---|
| 5,304,877 A | * | 4/1994 | Baek ............................... 310/45 |
| 5,780,945 A | | 7/1998 | Caviglia et al. |
| 2007/0194637 A1 | * | 8/2007 | Childe et al. ..................... 310/51 |
| 2010/0231064 A1 | * | 9/2010 | Leachman et al. ............... 310/51 |

FOREIGN PATENT DOCUMENTS

| | | |
|---|---|---|
| EP | 1 075 074 A2 | 2/2001 |
| GB | 2 406 223 A | 3/2005 |
| JP | 11-27911 A | 1/1999 |

(Continued)

OTHER PUBLICATIONS

Machine translation of JP 11027911 A (Jan. 1999).*

(Continued)

*Primary Examiner* — Michael Andrews
(74) *Attorney, Agent, or Firm* — Rothwell, Figg, Ernst & Manbeck, P.C.

(57) ABSTRACT

In order to provide a vacuum pump motor which is free from rotation imbalance, there is provided a vacuum pump motor 10 which is connected directly to a pump main shaft 21 of a vacuum pump 20, including a motor rotor 120 which is attached directly or indirectly to the pump main shaft 21 and balance rings 127 which are attached directly or indirectly to the pump main shaft 21 at ends thereof which are spaced apart from end portions of a rotor core 123, wherein the balance rings 127 contain a material having anticorrosion properties.

12 Claims, 3 Drawing Sheets

(56) References Cited

FOREIGN PATENT DOCUMENTS

| JP | 11027911 A * | 1/1999 | ............. H02K 17/16 |
|----|--------------|--------|--------------------------|
| JP | 3443248 B2   | 6/2003 |                          |

OTHER PUBLICATIONS

European Search Report mailed Sep. 9, 2013 in corresponding EP Application No. 13020045.4-1608 (7 pages).

* cited by examiner

VACUUM PUMP MOTOR AND VACUUM PUMP HAVING BALANCE RINGS

CROSS REFERENCE TO RELATED APPLICATION

This application claims priority to Japanese Application Number 2012-182203, filed Aug. 21, 2012, the entire content of which is hereby incorporated by reference.

TECHNICAL FIELD

The present invention relates to a vacuum pump motor and a vacuum pump including the same motor and more particularly to a vacuum pump motor in which balance rings are provided at both ends of a motor rotor in the direction of a rotating axis thereof and a vacuum pump including the same motor.

BACKGROUND ART

For example, vacuum pumps are used in semiconductor fabrication systems, and a motor as a drive source is provided thereto. As such a motor used in a vacuum pump, there is a motor having a structure in which a motor rotor is disposed directly on a pump main shaft. In the case of the motor having this structure, the motor rotor is exposed to a corrosive gas used in a semiconductor fabrication process. In addition, a sealing structure is realized to maintain a vacuum (low pressure) state in which a can is provided between a motor stator and the motor rotor (refer to Patent Document 1).

In addition, end rings are provided at both end portions of a rotor core of the motor rotor in the direction of a rotating axis thereof (refer to Patent Document 2). These end rings form an induction circuit together with the rotor core. However, since the motor rotor rotates at high speeds, in case there exists a rotation imbalance, large stress is applied to the pump main shaft, causing a deflection in the pump main shaft. In addition, there may be a case where the pump main shaft is caused to vibrate largely. As an approach to eliminate such a rotation imbalance, it is practiced that balance rings are attached to the pump main shaft so that the rotation of the pump main shaft is balanced by removing a little portion of the balance rings (refer to Patent Document 2).

CITATION LIST

Patent Document

[Patent Document 1] Japanese Patent No. 3443248
[Patent Document 2] Japanese Patent Public Disclosure No. 11-27911

SUMMARY OF INVENTION

Even if the can is provided between the motor rotor and the motor stator, the motor rotor is exposed to the corrosive gas as described above. Because of this, the motor rotor is corroded by the corrosive gas unless a countermeasure is taken. A surface treatment using an anticorrosion coating is often applied to the motor rotor in order to avoid the corrosion of the motor rotor. However, in the case of a motor in which only end rings are provided, in order to eliminate the rotation imbalance described above, little portions of the end rings is removed to keep the balance in rotation. This means that the anticorrosion coating is removed at the portions of the end rings where the end rings are partially removed, whereby the end rings are corroded at the portions where the end rings are partially removed.

It is also considered that the anticorrosion coating is applied after the end rings are partially removed. However, since the dimensions of the portions where the end rings are partially removed (correction holes) are very small, there often occurs a case where a coating of the anticorrosion material cannot be formed uniformly on the portions where the end rings are partially removed. Further, even when balance rings are attached, in the event that the little portions of the balance rings are removed, as in the case with the end rings, the problem remains unsolved that the coating of the anticorrosion material becomes uneven at the portions where little portions of the balance rings are removed.

The invention of this patent application has been made in view of the problem described above, and hence, an object thereof is to provide a vacuum pump motor which is free from rotation imbalance and a vacuum pump including the same motor. According to a first aspect of the invention, there is provided a vacuum pump motor which is coupled directly to a pump main shaft of a vacuum pump, including a motor rotor which is disposed directly or indirectly on the pump main shaft and balance rings which are disposed directly or indirectly on the pump main shaft at ends thereof which are spaced apart from end portions of a rotor core, wherein the balance rings contain a material having anticorrosion properties.

In addition, according to a second aspect of the invention, a configuration is adopted in which end rings are provided at end portions of the motor rotor and a predetermined gap is defined between the end rings and the balance rings.

Additionally, according to a third aspect of the invention, a configuration is adopted in which the balance rings each have an L-shaped cross-section and are disposed on a sleeve which is attached to the pump main shaft or disposed directly on the pump main shaft, having a function to position the motor rotor.

Further, according to a fourth aspect of the invention, a configuration is adopted in which a surface treatment involving anticorrosion coating or anticorrosion painting is applied to a surface of the motor rotor.

Furthermore, according to a fifth aspect of the invention, there is provided a vacuum pump including the motor according to any of the first to fourth aspects of the invention.

According to the invention, the corrosion-resistant motor rotor can be provided, and the problem of correcting the rotation imbalance can be solved to thereby realize an increase in performance. At the same time, by providing the axial gaps between the balance rings and the end rings, the interference of the balance rings with the end rings which expand as a result of thermal expansion can be avoided to thereby prevent the application of load in the direction of a rotating axis, providing an advantage that superiority in mechanical design can be realized.

DESCRIPTION OF EMBODIMENTS

Next, an embodiment of the invention of this patent application will be described based on the accompanying drawings.

[Summary of Overall Structure of Motor]

Figure 1:
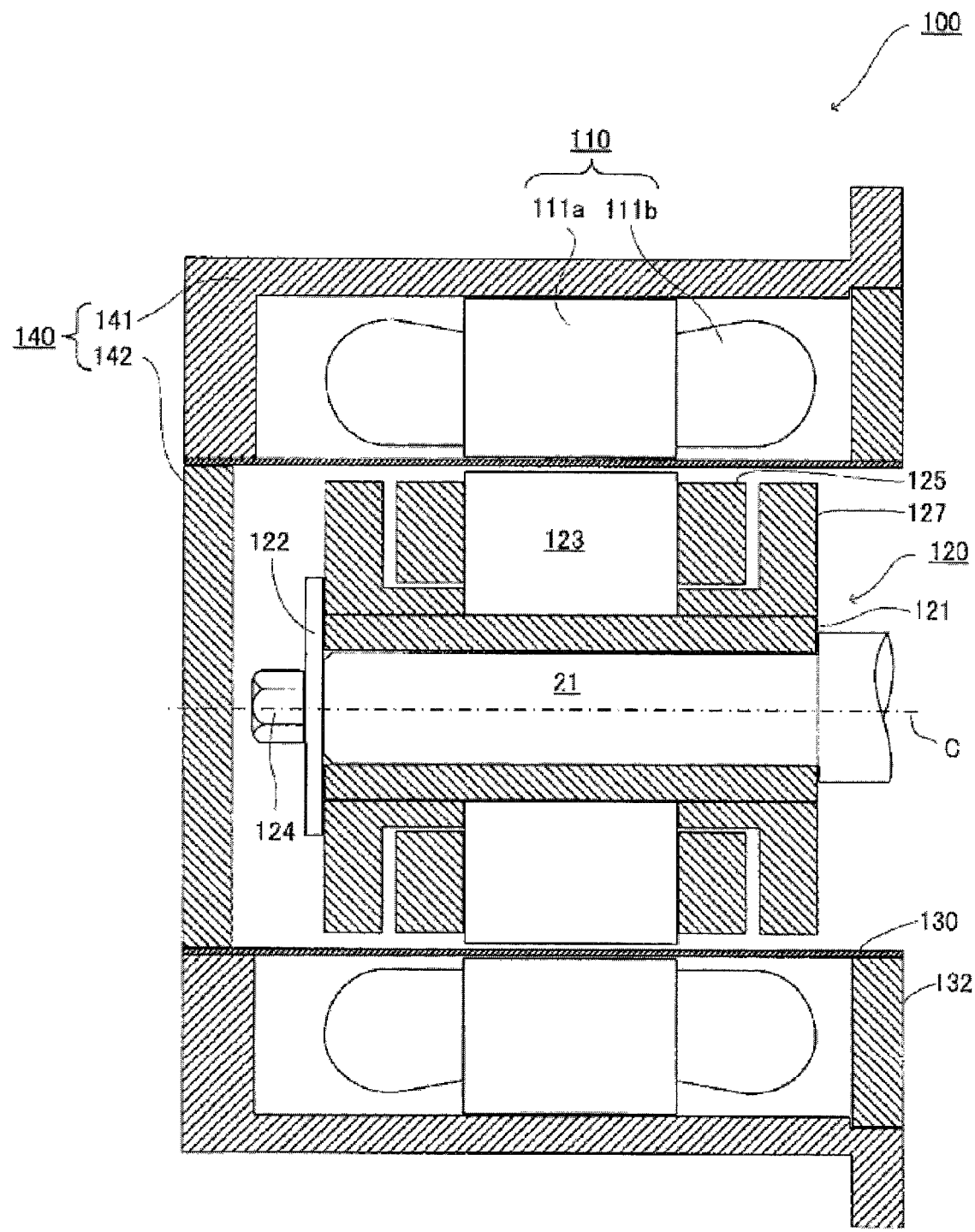
FIG. 1 is a sectional view showing a motor according to an embodiment of the invention.

Firstly, based on FIGS. 1 and 2, a motor 100 according to an embodiment of the invention will be described. The motor 100 according to the embodiment is intended to drive to rotate rotors 30 (refer to FIG. 3) of a vacuum pump. The motor 100 includes a motor stator 110, a motor rotor 120 and a motor frame 140.

The motor frame 140 includes a frame main body 141 and an end plate 142. The frame main body 141 has a cylindrical shape, and an interior space is formed in the frame main body 141 so as to extend along an axis of a pump main shaft 21. The end plate 142 is attached to an open end of the frame main body 141 with a required attaching mechanism. The motor frame 140 can be formed of iron or aluminum, for example. A motor stator 110 and a motor rotor 120 are accommodated in the interior space in the motor frame 140.

[Motor Stator]

The motor stator 110 has a configuration in which coils 111b are attached to a stator core 111a. Specifically, in the motor stator 110, the coils 111b protrudes axially outwards at both ends thereof in the direction of a rotating axis C of the pump main shaft 21. The motor stator 110 is fixed to the motor frame 140 concentrically with respect to the rotating axis C of the pump main shaft 21 by the stator core 111a being fitted in an inner surface of the frame main body 141 of the motor frame 140. The stator core 111a can be formed by laminating silicone steel plates, for example.

[Motor Rotor]

The motor rotor 120 is disposed concentrically with respect to the rotating axis C of the pump main shaft 21 in an interior of the motor stator 110 and is connected directly to the pump main shaft 21 of a vacuum pump 20. The motor rotor 120 includes a sleeve 121 which is attached to an outer circumferential surface of the pump main shaft 21, a rotor core 123 which is fixedly fitted on the sleeve 121, end rings 125 which are disposed at both ends of the rotor core 123 in the direction of the rotating axis C of the pump main shaft 21 and balance rings 127 which are disposed at ends of an outer circumferential surface of the sleeve 121 which are situated further axially outwards than the end rings 125.

The sleeve 121 is attached to a diametrically reduced portion of the pump main shaft 21 which is formed at a distal end portion thereof and is fixed in place by a washer member 122 and a bolt 124. It is desirable to provide a rotation preventive or locking mechanism made up of a key and a key groove in a boundary area between the pump main shaft 21 and the sleeve 121 so as to prevent a relative rotation therebetween. Additionally, the rotor core 123 is fixed to the outer circumferential surface of the sleeve 121. The rotor core 123 receives a magnetic force from the motor stator 110 to thereby produce a rotating force in the motor rotor 120.

The end rings 125 which are attached individually to the ends of the rotor core 123 (the ends of the rotor core 123 in the direction of the rotating axis of the pump main shaft) connect to the rotor core 123 so as to form an induction circuit and are made up of a conductor made of a material having a high electric conductivity such as aluminum or copper. The end rings 125 are integrated with the motor rotor 120. The end rings 125 of this embodiment are each formed into a simple ring member having a rectangular cross section. Aluminum or copper is corroded by a corrosive gas used in the semiconductor fabrication process, and therefore, a surface treatment involving anticorrosion coating or anticorrosion painting is applied to the surfaces of the rotor core 123 and the end rings 125.

The balance rings 127 are attached to the outer circumferential surface of the sleeve 121 at the ends thereof which are situated further axially outwards than the end rings 125. The balance rings 127 are intended to eliminate a rotation imbalance produced in the motor rotor 120. The balance rings 127 each have an L-shaped section. Of two side portions which make up the L-shaped section, one side portion is in abutment with the sleeve 121, and the other side portion rises in a direction which is at right angles to the rotating axis C of the pump main shaft 21. In addition to the function of eliminating the rotation imbalance, the balance rings 127 having the L-shaped section also have a function to position the rotor core 123. In addition, the balance rings 127 are made of an anticorrosion material such as stainless steel or a material which contains such an anticorrosion material at least partially.

In this embodiment, a predetermined gap is defined in the direction of the rotating axis C between the end ring 125 and the balance ring 127, and a predetermined gap is also defined therebetween in the direction which is at right angles to the rotating axis C. Because of this, even in the event that the end ring 125 and the balance ring 127 are made of materials having different thermal expansion coefficients, there is produced no stress between the two members by thermal expansion. In addition, an end portion of the one side portion of the balance ring 127 is in abutment with the rotor core 123. Since it is necessary to prevent a relative rotation between the balance ring 127 and the sleeve 121, it is desirable to provide a rotation preventive or locking mechanism made up of a key and a key groove in a boundary area between the two members.

[Can Construction]

A can 130 is provided in the interior of the motor 100. The can 130 is intended to separate a space where the motor rotor 120 resides and a space where the motor stator 110 resides. This is because in the case of the motor 100 used in the vacuum pump 20 (refer to FIG. 3), a vacuum (or low pressure) state needs to be maintained in the space where the pump main shaft 21 and the motor rotor 120 reside. Additionally, the vacuum pump 20 is often used in a semiconductor fabrication facility, and a countermeasure for preventing the leakage of a process gas used in fabrication of semiconductors needs to be taken in the vacuum pump 20. Thus, the can 130 plays this role.

The can 130 of this embodiment is a cylindrical member which is opened at both ends thereof and is made of a metallic material. As shown in FIG. 1, the can 130 is held by the frame main body 141 and the end plate 142 therebetween at one end thereof and is fixed to an inner circumferential surface of a ring-shaped sealing member 132 at the other end (a right end in FIG. 1). By adopting this configuration, although the space where the motor rotor 120 resides is allowed to communicate with the vacuum pump 20, the space where the motor stator 110 resides is isolated from the vacuum (low pressure) state.

Figure 2:
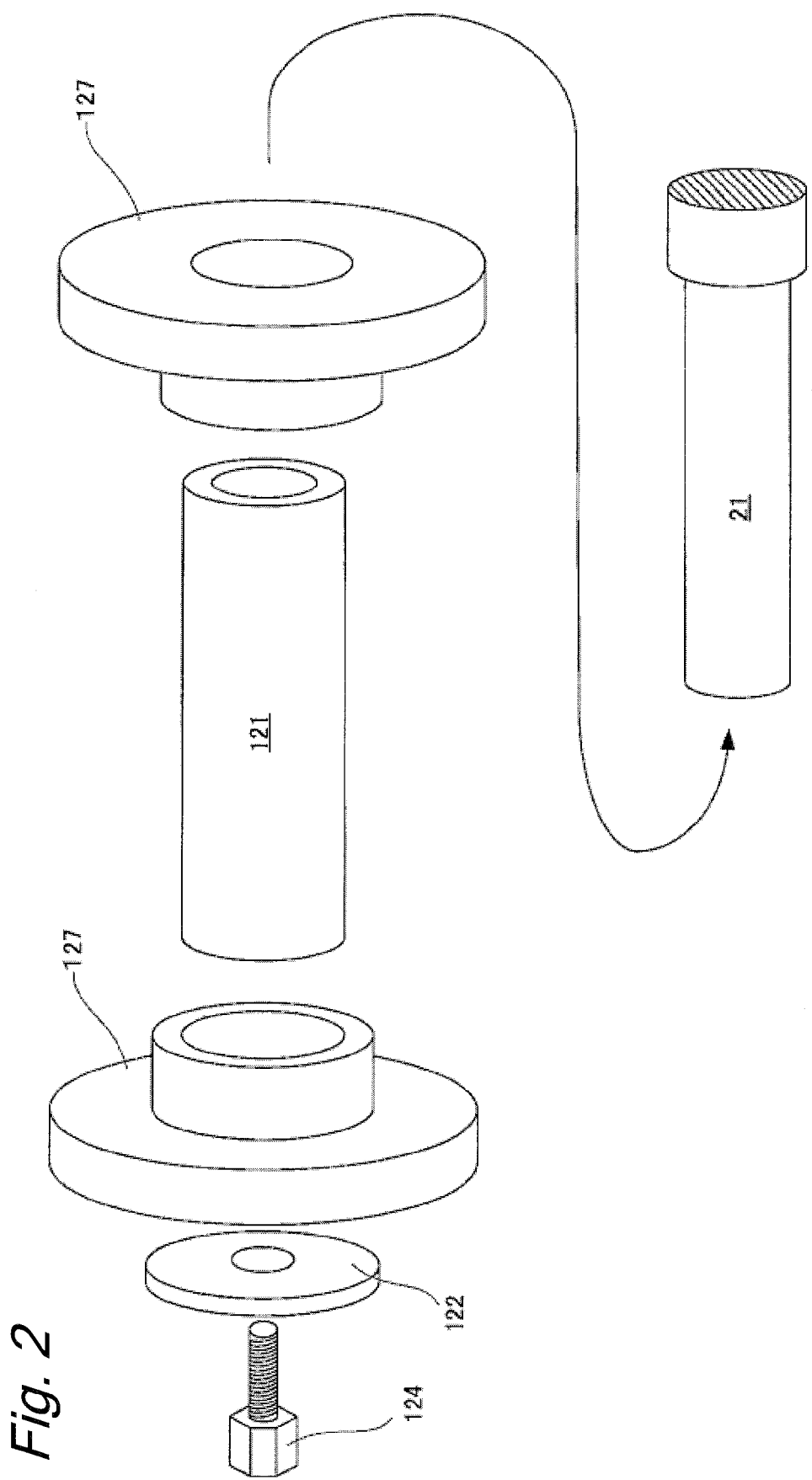
FIG. 2 is a perspective view showing some constituent components of the motor shown in FIG. 1.

FIG. 2 is a perspective view intended to help a reader to understand the invention and shows some constituent components of the motor 100. Specifically, FIG. 2 shows the pump main shaft 21, the sleeve 121, the balance rings 127, the washer member 122 and the bolt 124. As shown therein, the balance rings 127 are fixed onto the sleeve 121, and the sleeve 121 is attached to the pump main shaft 21. Then, the bolt 124 is screwed into the pump main shaft 21 via the washer member 122. In the motor 100 of this embodiment, although the rotor core 123 is placed on the outer circumferential surface of the sleeve 121, in this invention, since the sleeve 121 is not an indispensable constituent element, it is possible to omit the sleeve 121.

[Function]

Next, the function of the motor 100 configured as has been described heretofore will be described. At the time of fabrication of a motor 100, with a sleeve 121, a rotor core 123 and end rings 125 assembled to a pump main shaft 21, a rotation imbalance is produced as a result of a fabrication tolerance. In order to eliminate the rotation imbalance so produced, it is considered, for example, to remove part of the end rings 125. However, the anticorrosion coating applied thereto is also removed together the part of the end rings 125 so removed. Thus, the portions of the end rings 125 where the end rings 125 are partially removed are corroded by the process gas.

To counteract this, in this embodiment, the balance rings 127 are provided. Namely, with the balance rings 127 which are made of the anticorrosion material attached to the sleeve 121, a rotation imbalance is measured. Then, the balance rings 127 are removed partially in order to eliminate the rotation imbalance. Even in the event that the balance rings 127 are partially removed, the balance rings 127 are made of the anticorrosion material, and therefore, the balance rings 127 are not corroded.

[Vacuum Pump]

Figure 3:
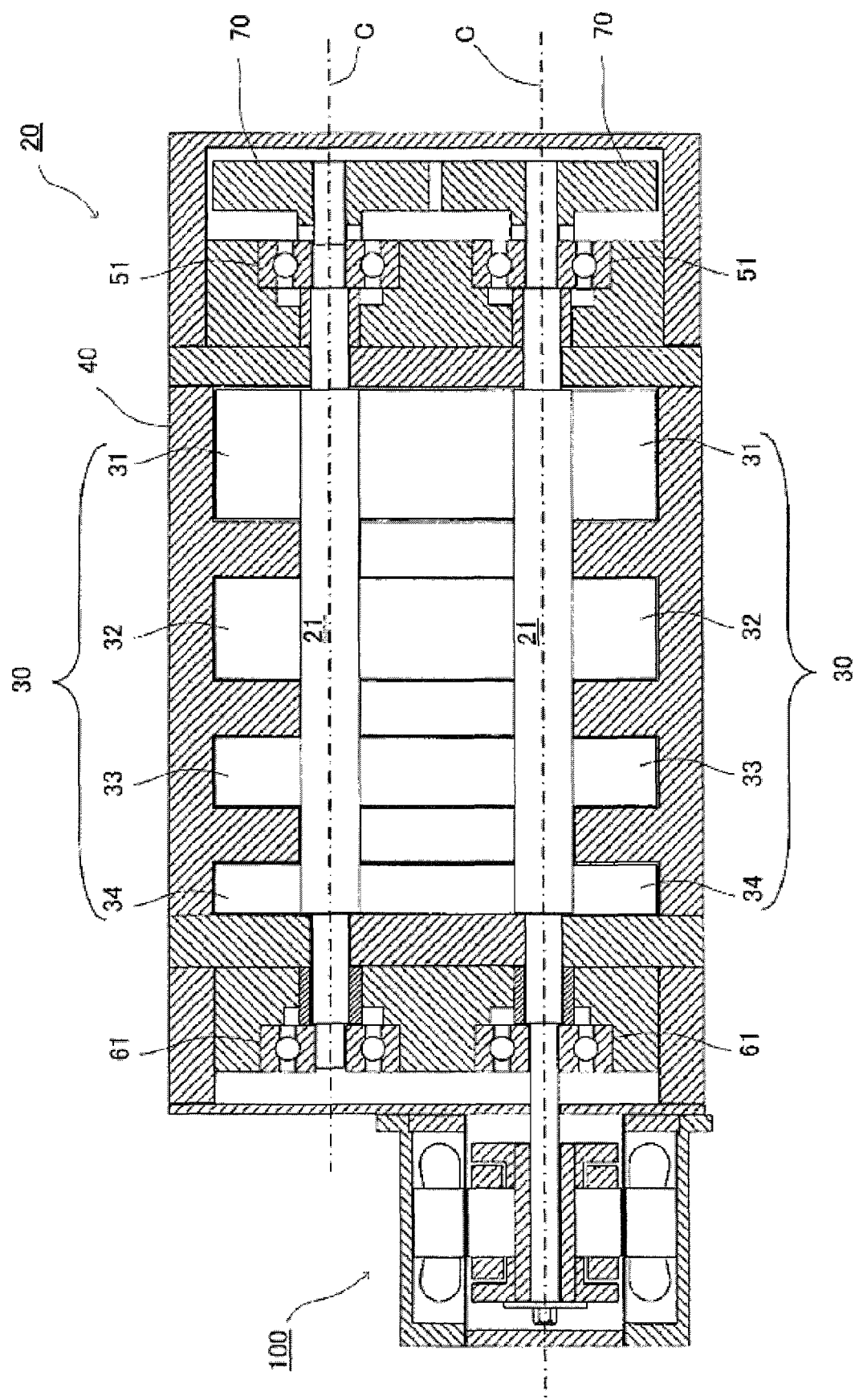
FIG. 3 is a sectional view showing a vacuum pump including the motor shown in FIG. 1.

Next, the vacuum pump 20 will be described based on FIG. 3 which includes the motor 100 according to the embodiment. FIG. 3 shows a section of the vacuum pump 20 taken along a portion which contains the rotating axes C of two pump main shafts 21 provided in the vacuum pump 20. As shown in the figure, the vacuum pump 20 includes a pair of rotors 30. In the motor 100 of this embodiment, each rotor 30 includes a first stage rotor 31, a second stage rotor 32, a third stage rotor 33 and a fourth stage rotor 34. The pump main shafts 21 which support these rotors 30 are supported by bearings 51, 61 near both end portions thereof. In addition, the rotors 30 are accommodated within a casing 40.

The rotors 30 are driven by the motor 100. A pair of timing gears 70 which mesh with each other is fixed to the other end of the pump rotors 30. By doing so, the pump main shafts 21 and the pump rotors 30 are made to rotate in opposite directions to each other at the same speed.

When the motor 100 is driven, the pump rotors 30 rotate in opposite directions without contacting each other with slight gaps held between an inner surface of the casing 40 and the pump rotors 30 and between the pump rotors 30 themselves. A gas at an induction side is shut in between the pump rotors 30 and the casing 40 and is then moved towards a discharge end as the pair of pump rotors 30 rotates. The gas induced from an induction port (whose illustration is omitted) is compressed and moved towards a discharge port (whose illustration is omitted) by the fourth stage rotors 34 to thereby be discharged from the discharge port.

It should be noted that in the embodiment, the invention is described as a combination of the individual constituent elements. In this invention, as long as the sealing construction can be realized, arbitrary combinations of the individual constituent elements are understood to fall within the scope of the invention. For example, although the invention is described as incorporating all constituent elements A, B, and C, in the event that those skilled in the art determine that the invention can be established even by a combination of A and B, it should be understood that the combination of A and B falls within the scope of the invention.

INDUSTRIAL APPLICABILITY

The invention of this patent application can be applied to eliminate the rotation imbalance of the vacuum pump motor.

REFERENCE SIGNS LIST 20 vacuum pump; 21 pump main shaft; 100 motor; 110 motor stator; 120 rotor; 121 sleeve; 123 rotor core; 125 end ring; 127 balance ring; 130 can.

What is claimed is:

1. A vacuum pump motor which is coupled to a pump main shaft of a vacuum pump, comprising:
   a motor rotor which is disposed directly or indirectly on the pump main shaft;
   a motor stator which is fixed to a motor frame concentrically with respect to a rotating axis of the pump main shaft; and
   balance rings each of which includes a first portion extending in a direction of the rotating axis of the pump main shaft, and wherein each first portion is disposed directly or indirectly on to make contact with the pump main shaft, and wherein the balance rings each include a second portion extending in a direction at a right angle to the rotating axis of the pump main shaft, wherein the second portions are disposed at opposite ends of the pump main shaft, and further wherein the second portions are spaced apart from opposite end portions of a rotor core, wherein the balance rings contain a material having anticorrosion properties, wherein each of the balance rings has an L-shaped cross-section formed by the first portion and the second portion, and wherein end rings are provided at opposite end portions of the rotor core such that a predetermined gap is defined between the end rings and the first portions of the balance rings and a predetermined gap is defined between the end rings and the second portions of the balance rings.

2. The motor according to claim 1, wherein the first portions of the balance rings abut with the rotor core to position the motor rotor.

3. A vacuum pump comprising: the motor according to claim 2.

4. The motor according to claim 2, wherein a surface of the motor rotor includes an anticorrosion coating or an anticorrosion paint.

5. A vacuum pump comprising: the motor according to claim 4.

6. The motor according to claim 1, wherein a surface of the motor rotor includes an anticorrosion coating or an anticorrosion paint.

7. A vacuum pump comprising: the motor according to claim 6.

8. A vacuum pump comprising: the motor according to claim 1.

9. The motor according to claim 1, further comprising a can which separates a space where the motor rotor resides and a space where the motor stator resides.

10. A vacuum pump comprising: the motor according to claim 9.

11. A motor according to claim 1, wherein the balance rings are at least partially made of stainless steel.

12. A vacuum pump comprising: the motor according to claim 11.

* * * * *